UNITED STATES PATENT OFFICE.

ELMER K. BOLTON, OF WILMINGTON, DELAWARE, ASSIGNOR TO E. I. du PONT de NEMOURS AND COMPANY, OF WILMINGTON, DELAWARE, A CORPORATION OF DELAWARE.

PROCESS OF DIAZOTIZATION.

1,320,443. Specification of Letters Patent. Patented Nov. 4, 1919.

No Drawing. Application filed March 26, 1917. Serial No. 157,431.

*To all whom it may concern:*

Be it known that I, ELMER K. BOLTON, of Wilmington, in the county of New Castle, and in the State of Delaware, have invented a certain new and useful Improvement in Processes of Diazotization, and do hereby declare that the following is a full, clear, and exact description thereof.

My invention relates particularly to processes of diazotizing compounds, but more particularly, aromatic organic compounds.

The object of my invention is to provide a process by means of which diazotizations may be carried out in an advantageous manner, so that the resulting product may be separated more readily from the other substances present, and so that the cost of production may be materially reduced. A further object is to utilize niter cake in diazotizations. Other objects of my invention will appear from the detailed description thereof hereinafter.

I have discovered that niter cake may be used to great advantage in diazotizations, particularly of aromatic amins and substituted aromatic amins. The action of the niter cake in a solution containing an amin and sodium nitrite is to form a salt with the amin and to liberate nitrous acid from the sodium nitrite present, the nitrous acid then acting upon the salt of the amin to produce the corresponding diazonium salt, which in turn may become coupled with other components, such as amins, phenols, and amidophenols, sulfonic acids, hydroxysulfonic acids, and the other substances with which diazonium salts may be coupled. I have found that not only is the use of niter cake conducive to cheapness, but that the increased amount of sodium sulfate which is formed in the process, together with the small quantity of sodium sulfate which accompanies the niter cake as an impurity, facilitates the separation of the product after diazotizing and coupling with other components. This is especially true in the cases where the products separate slowly from the solution or are only slightly soluble. Where the product is very soluble the quantity of sodium sulfate present reduces the amount of the salt which it is necessary to add to separate out the product to be obtained.

For example, in carrying out my invention I may proceed as follows:

Sixty grams of anilin are converted into anilin sulfate by the addition of 51.3 grams of niter cake (sodium bisulfate) showing, on analysis, a 35% acidity measured as sulfuric acid, and 22.3 grams of sodium nitrite are then added so as to diazotize the anilin sulfate which then becomes coupled with the excess of anilin to produce diazoamidobenzol, which separates out quantitatively and immediately from the water solution.

While I have described my invention above in detail, I wish it to be understood that many changes may be made therein without departing from the spirit thereof.

I claim:—

1. The process of diazotizing an aromatic amin which comprises causing sodium bisulfate to react with a nitrite to form nitrous acid in the presence of said amin.

2. The process of diazotizing an aromatic amin which comprises causing niter cake in solution to react with a nitrite to form nitrous acid in the presence of said amin.

3. The process of diazotizing anilin which comprises causing sodium bisulfate to react with a nitrite to form nitrous acid in the presence of said anilin.

4. The process of diazotizing anilin which comprises causing niter cake in solution to react with a nitrite to form nitrous acid in the presence of said anilin.

5. The process of diazotizing an aromatic amin which comprises causing sodium bisulfate to react with a nitrite to form nitrous acid in the presence of an excess of said amin over the amount required to form the corresponding diazonium salt.

6. The process of diazotizing an aromatic amin which comprises causing niter cake in solution to react with a nitrite to form nitrous acid in the presence of an excess of said amin over the amount required to form the corresponding diazonium salt.

7. The process of diazotizing anilin which comprises causing sodium bisulfate to react with a nitrite to form nitrous acid in the presence of an excess of such anilin over the amount required to form benzene diazonium sulfate.

8. The process of diazotizing anilin which comprises causing niter cake in solution to react with a nitrite to form nitrous acid in the presence of an excess of such anilin over the amount required to form benzene diazonium sulfate.

9. The process which comprises diazotizing an aromatic amin with the aid of sodium bisulfate in an excess of the aromatic amin, thereby producing a diazoamido compound which separates out from the solution, sodium nitrite being added to provide nitrous acid in the diazotization.

10. The process which comprises diazotizing an aromatic amin with the aid of niter cake in an excess of the aromatic amin, thereby producing a diazoamido compound which separates out from the solution, sodium nitrite being added to provide nitrous acid in the diazotization.

11. The process which comprises diazotizing anilin with the aid of sodium bisulfate in an excess of anilin, thereby producing diazoamidobenzol which separates out from the solution, sodium nitrite being added to provide nitrous acid in the diazotization.

12. The process which comprises diazotizing anilin with the aid of niter cake in an excess of anilin, thereby producing diazoamidobenzol which separates out from the solution, sodium nitrite being added to provide nitrous acid in the diazotization.

13. A process which comprises adding to 60 grams of anilin, 51.3 grams of niter cake, and then 22.3 grams of sodium nitrite thereby separating out diazoamidobenzol.

14. A process of diazotizing an aromatic amin which comprises mixing the latter with sodium bisulfate and then adding to the resulting product a nitrite.

In testimony that I claim the foregoing I have hereunto set my hand.

ELMER K. BOLTON.

Witnesses:
P. E. STRICKLAND,
EDMUND G. ROBINSON.